United States Patent
Anders, Jr. et al.

(10) Patent No.: US 9,019,878 B2
(45) Date of Patent: Apr. 28, 2015

(54) PHONE SUPPORTING MODE CONVERSION

(75) Inventors: Billy R. Anders, Jr., Bothell, WA (US);
Dennis Flanagan, Bellevue, WA (US);
Amer A. Hassan, Kirkland, WA (US);
Yatharth Gupta, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 13/160,259

(22) Filed: Jun. 14, 2011

(65) Prior Publication Data
US 2012/0320886 A1    Dec. 20, 2012

(51) Int. Cl.
*H04W 48/20* (2009.01)
*H04W 76/02* (2009.01)
H04W 52/02 (2009.01)
H04W 84/18 (2009.01)
H04W 88/04 (2009.01)
H04W 88/06 (2009.01)

(52) U.S. Cl.
CPC ............ *H04W 76/023* (2013.01); *H04W 52/02* (2013.01); *H04W 48/20* (2013.01); *H04W 84/18* (2013.01); *H04W 88/04* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,002,918 A | 12/1999 | Heiman | |
| 7,379,435 B1 * | 5/2008 | Kinder | 370/324 |
| 7,933,635 B2 * | 4/2011 | Oh et al. | 455/574 |
| 8,005,061 B2 * | 8/2011 | Abdel-Kader et al. | 370/345 |
| 2005/0154933 A1 * | 7/2005 | Hsu et al. | 713/320 |
| 2005/0233776 A1 | 10/2005 | Allen | |
| 2006/0104235 A1 * | 5/2006 | Fritz et al. | 370/328 |
| 2007/0159992 A1 * | 7/2007 | Kim | 370/311 |
| 2007/0189168 A1 * | 8/2007 | Yao | 370/231 |
| 2007/0204021 A1 * | 8/2007 | Ekl et al. | 709/223 |
| 2008/0192666 A1 * | 8/2008 | Koskan et al. | 370/311 |
| 2008/0198819 A1 * | 8/2008 | Brown et al. | 370/338 |
| 2009/0010190 A1 * | 1/2009 | Gong | 370/311 |
| 2010/0020746 A1 * | 1/2010 | Zaks | 370/328 |
| 2010/0195611 A1 * | 8/2010 | Allen et al. | 370/329 |
| 2010/0246460 A1 | 9/2010 | Kholaif | |
| 2010/0246464 A1 | 9/2010 | Sun | |
| 2010/0260158 A1 * | 10/2010 | Naito et al. | 370/338 |
| 2010/0284316 A1 * | 11/2010 | Sampathkumar | 370/311 |

(Continued)

OTHER PUBLICATIONS

Wi-Fi direct lets wireless devices talk face to face—Retrieved Date: Mar. 1, 2011 http://www.tidewaternetworksolutions.com/index. php?option=com_k2&view=item&id=18:wi-fi-direct-lets-wireless-devices-talk-face-to-face&Itemid=70.

(Continued)

*Primary Examiner* — Timothy J Weidner
(74) *Attorney, Agent, or Firm* — Alin Corie; Kate Drakos; Micky Minhas

(57) ABSTRACT

A mechanism for a wireless device to obtain access to network connectivity through a WAN-enabled device. The wireless device may use peer-to-peer communication to request the WAN-enabled device enter a mode in which it serves as an access point to its WAN. The wireless device may then associate with the WAN-enabled device in its role as an access point to access connectivity services. Such a capability may be used, for example, to allow a wireless computing device to gain access to the Internet through a smartphone or other device that has Internet access, and can also be configured to communicate in accordance with the Wi-Fi and Wi-Fi Direct standards.

19 Claims, 6 Drawing Sheets

(56) References Cited

U.S. PATENT DOCUMENTS

| | | | |
|---|---|---|---|
| 2011/0034127 A1* | 2/2011 | Wentink et al. | 455/41.2 |
| 2011/0310863 A1* | 12/2011 | Shieh | 370/338 |
| 2012/0233266 A1* | 9/2012 | Hassan et al. | 709/206 |
| 2012/0246294 A1* | 9/2012 | Eaton et al. | 709/224 |
| 2012/0297229 A1* | 11/2012 | Desai et al. | 709/227 |

OTHER PUBLICATIONS

Wi-Fi Certified™ makes it Wi-Fi—Retrieved Date: Mar. 1, 2011 http://www.wi-fi.orq/knowledge_center_overview.php?type=2.

* cited by examiner

PHONE SUPPORTING MODE CONVERSION

BACKGROUND

Many computers today have radios to support wireless communication. Wireless communication is used, for example, to connect to an access point of a network. By associating with the access point, a wireless computer can access devices on the network or to other networks reachable through that network, such as the Internet. As a result, the wireless computer can exchange data with many other devices, enabling many useful functions.

To enable computers to be configured for association with an access point, it is common for access points to operate according to a standard. A common standard for devices that connect to access points is called Wi-Fi. This standard was promulgated by the Wi-Fi Alliance, and is widely used in portable computers. There are multiple versions of this standard, but any of them can be used to support connections through access points.

A connection through an access point is sometimes called an "infrastructure" connection, because an infrastructure, including the access point, needs to be in place for the connection to be formed. Wireless communications may also be used to form connections directly to other devices without using an access point. These connections are sometimes called "peer-to-peer" connections and may be used, for example, to allow a computer to connect to a mouse or keyboard wirelessly. Wireless communications for these direct connections also have been standardized. A common standard for such wireless communications is called BLUETOOTH®.

In some instances, a wireless computer may concurrently connect to other devices through an access point and as part of a group engaging in peer-to-peer communications. To support such concurrent communication, some computers have multiple radios. More recently a standard has been proposed, called Wi-Fi Direct, that enables both an infrastructure connection and communication as part of a peer-to-peer group with similar wireless communications that can be processed with a single radio. This standard, also published by the Wi-Fi Alliance, extends the popular Wi-Fi communications standard for infrastructure-based communications to support direct connections.

Such direct connections may be formed among groups of devices. In accordance with the Wi-Fi Direct standard, devices that wish to communicate may exchange messages, formatted as action frames, to form a group. Initially forming a group may require user input, such as to enter a PIN or other information that serves to authorize devices to connect with one another. This process of forming an initial connection is sometimes called "pairing."

Part of forming a group according to the Wi-Fi Direct standard may be selecting a device to operate as a Group Owner. The Group Owner acts as a controller for the group. The Group Owner, for example, may control which devices are admitted to the group. The Group Owner may also provide services to devices in the group. For example, if the Group Owner has a connection to the Internet, it may provide an Internet Connection Service such that other devices in the group can access the Internet through the Group Owner.

SUMMARY

The experience of a user of wireless devices may be enhanced by configuring a wireless device that can support peer-to-peer communications and a connection to a wide area network (WAN) to change its operating mode in response to a request received over a peer-to-peer connection. The wireless device, for example, may receive a command to enter a mode in which it configures itself as an access point to the WAN.

The WAN may be a cellular network through which Internet connectivity may be obtained. In this way, a wireless device, such as a smartphone, that can access the Internet may provide an Internet connection service. Though, the device may operate for limited periods of time in this mode so as to avoid draining the battery of the device.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
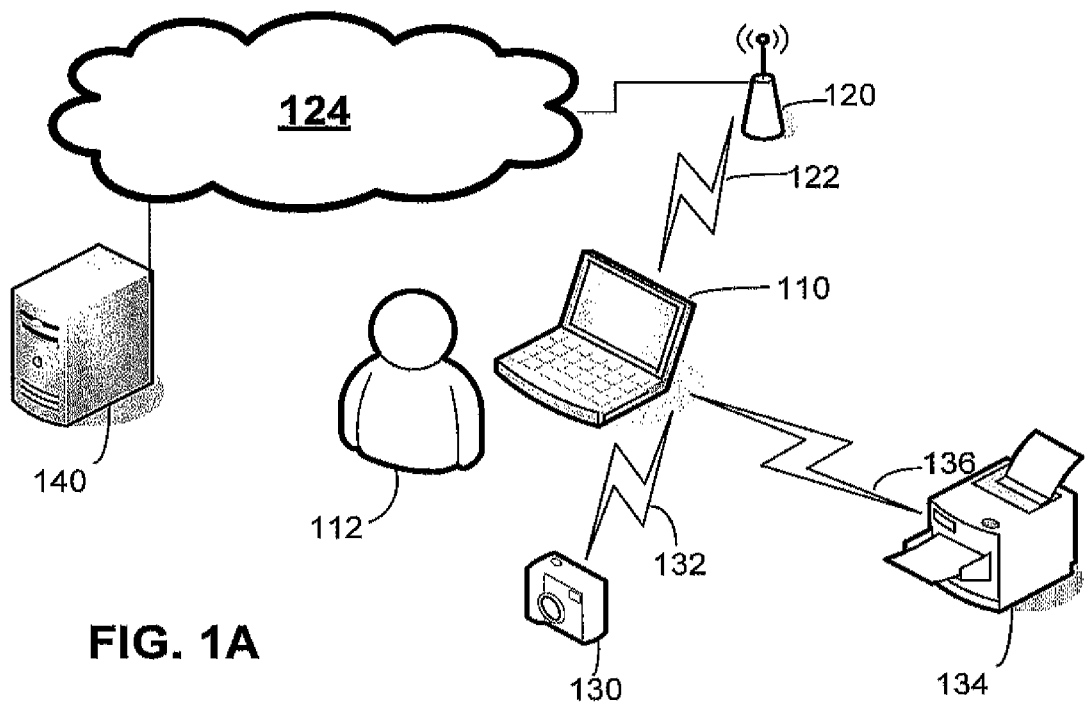
FIG. 1A is a sketch of an environment in which wireless communication upon multiple devices may occur.

The inventors have recognized and appreciated that, though peer-to-peer protocols that can provide Internet connectivity are desirable in some circumstances, for some users these protocols will result in unacceptable drain on the batteries of their devices or an inability to communicate in some scenarios. The inventors have further recognized and appreciated that greater utility and increased battery life may be obtained by using peer-to-peer communication to trigger a device, capable of both supporting peer-to-peer communication and of supporting a connection to a WAN, to enter a mode in which it provides a service based on a connection over the WAN.

By triggering the WAN-enabled device to enter a mode in which it supports a connection based on a received peer-to-peer communication the WAN-enabled device can operate in a lower power mode when other wireless devices are not accessing the connection service. The WAN-enabled device, for example, need not send beacons when other wireless devices are not actively seeking to use the connection service. Alternatively or additionally, the communication, triggering a mode change, may be sent over a separate communication channel than that used by the WAN, which may also facilitate lower power operation or other advantages in a particular scenario. Moreover, this capability is achieved without requiring a user to configure the WAN-enabled device.

These capabilities may be supplied by a wireless device operating according to the Wi-Fi Direct standard. In some embodiments, the WAN-enabled device may join a peer-to-peer group as a client. As a client, the WAN-enabled device may receive a request to configure itself as a Wi-Fi access point to the WAN and may then associate with and provide a connection service to the wireless device. Depending on the capabilities of the WAN-enabled device, when it changes its operating mode, it may stay connected in the peer-to-peer group formed according to the Wi-Fi Direct standard or may drop out of the peer-to-peer group, possibly rejoining at a later time.

Joining the peer-to-peer group as a client may provide lower power operation than if the WAN-enabled device were the Group Owner and may provide performance that matches user expectations in at least some scenarios. Though the WAN-enabled device could join a peer-to-peer group as a Group Owner to support an Internet Connection Service as defined by the Wi-Fi Direct standard, having the WAN-enabled device assume the role of a Group Owner may provide a user with an undesirable experience, at least in some scenarios. As a Group Owner, for example, a WAN-enabled device may expend more energy on communicating within the group than when configured as a client. This expenditure of energy, for example, may come about because of additional communications sent by a Group Owner than by a client and because of greater restrictions on the times when the Group Owner can enter a power saving mode. Further, if the WAN-enabled device is more mobile that other devices in the peer-to-peer group or not moved along with other devices in the peer-to-peer group, making the WAN-enabled device the Group Owner simply to support a connection service may result in other operations of the peer-to-peer group being disrupted when the WAN-enabled device is separated from the other devices in the group.

In some embodiments, the WAN-enabled device may be a cell phone, and the WAN may be a cellular network. The WAN-enabled device may also include a Wi-Fi radio that can be configured to support peer-to-peer communication in accordance with the Wi-Fi Direct standard and/or to support communication as a Wi-Fi access point. The WAN-enabled device may also include a connection service such that wireless devices associating with the access point can access the cellular network, and, for example, may access the Internet using the cellular network.

The forgoing techniques may be used alone or together in any suitable combination in any suitable environment. FIG. 1A illustrates an exemplary environment in which a plurality of wireless devices may form a peer-to-peer group. As an example of a peer-to-peer group, devices operating in accordance with a Wi-Fi Direct protocol are described herein. However, it should be appreciated that any suitable peer-to-peer protocol may be used.

In the example of FIG. 1A, computing device 110 is illustrated as a laptop computer. Though, it should be appreciated that the form factor of computing device 110 is not a limitation on the invention. Computing devices configured as tablets, smartphones or with any other suitable form factor may be configured and operated according to embodiments of the invention. Moreover, it should be appreciated that any wireless device may play any role in a peer-to-peer group. Accordingly, it is not a requirement that any of the devices in the group be a computing device.

FIG. 1A illustrates that computing device 110 is being operated by user 112. User 112 may interact with computing device 110 using techniques as are known in the art to control computing device 110 to wirelessly connect with other devices.

In this example, FIG. 1A illustrates peer-to-peer wireless connections. Computing device 110 is shown to have connections 132 and 136 to camera 130 and printer 134, respectively. In this case, camera 130 and printer 134 are examples of wireless devices with which computing device 110 may connect in order to exchange data.

Camera 130, printer 134 and computing device 110 may communicate over wireless connections 132 and 136 using a peer-to-peer protocol that supports persistent groups. In this example, camera 130, printer 134 and computing device 110 may form a persistent group according to a peer-to-peer protocol. Though, in alternative embodiments, computing device 110 may form a first group with camera 130 and a second group with printer 134. Accordingly, it should be appreciated that a group may be made up of any suitable number of devices, including only two devices.

Wireless connections 132 and 136 may be formed according to any suitable peer-to-peer protocol. In this example, connections 132 and 136 are formed using an extension of the Wi-Fi protocol, referred to as Wi-Fi Direct. Connections 132 and 136 may be formed as persistent connections, in accordance with that protocol. As a result, each of the devices that forms a group with another device may store group profile information representing groups of two or more devices that have performed pairing in order to establish a connection. The group profile information may be stored during initial pairing of the devices to form a group and later may be used to reestablish a connection if it is disrupted.

In this example, computing device 110 also has a wireless connection through access point 120 to network 124. Wireless connection 122 through access point 120 is an example of an infrastructure type connection. Any suitable technique may be used to form wireless connection 122, including techniques that employ known infrastructure type protocols. As one example, wireless connection 122 may be formed using a protocol sometimes called "Wi-Fi." Though, the specific protocol used is not critical to the invention.

In the example illustrated, computing device 110 has the role of a station in wireless connection 122. The role of the computing device 110 indicates the specific steps of the wireless protocol performed by computing device 110 in order to exchange information with access point 120. Network 124 may be a home network, an enterprise network, the Internet or any other suitable network. In the embodiment illustrated, network 124 may be the Internet, allowing computing device 110 to access computing devices, such as server 140, from anywhere in the world the Internet can be accessed.

Having a group of devices may allow a user of a computing device that is a member of the group to access functionality of other devices in the group. For example, user 112, through computing device 110, may copy digital data representing pictures from camera 130 such that those pictures may be presented on a display of computing device 110. Similarly, user 112, through interactions with computing device 110, may send digital data representing an item to print to printer 134. Having both camera 130 and 134 in a group with computing device 110 allows user 112 to interact with both camera 130 and printer 134. Having these devices in a group may also allow data to be conveyed from camera 130 to printer 134 such that a user of camera 130 may cause pictures to be printed at printer 134.

As illustrated in FIG. 1A, computing device 110 can be configured both to communicate as part of a peer-to-peer group and to maintain a connection to an access point 120. Accordingly, computing device 110 may provide an Internet connection service to other devices in the peer-to-peer group. Such a service may be provided in accordance with portions of the Wi-Fi Direct standard because, in this case, computing device 110 is operating as the Group Owner. Through such a connection, for example, printer 134 may download a firmware update or obtain other useful information over Internet 124.

Though the scenario illustrated in FIG. 1A allows an Internet connection service to be provided, one or more of the conditions that allow that Internet connection service to be provided may not exist in all scenarios in which a connection service is desired. One such condition is that there be a hardwired access point 120, operating according to the Wi-Fi standard that can provide access to the Internet to a device, such a computing device 110. This hardwired access point 120, for example, may be a public place hotspot or part of an enterprise, home network or other suitable network. Another condition is that the computing device 110, which can associate with access point 120, is otherwise a Group Owner in a peer-to-peer group. However, even when these conditions do not exist, it may be desirable to provide an Internet connection service.

Figure 1B:
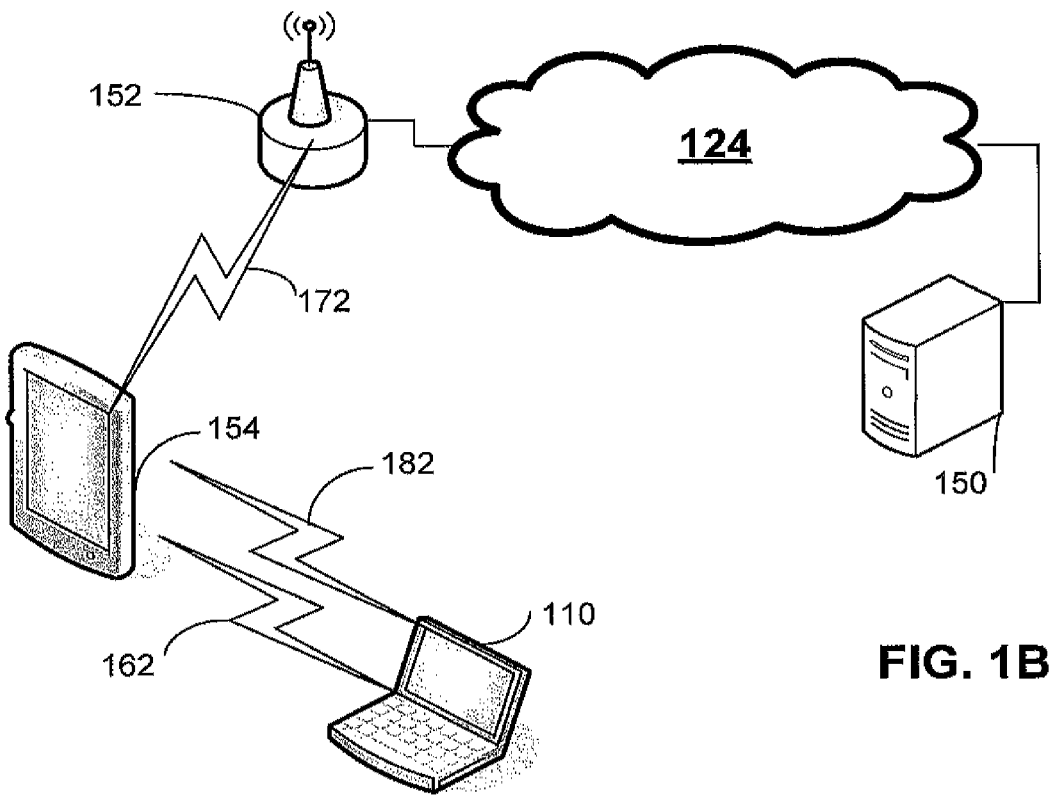
FIG. 1B is a sketch of an exemplary environment in which a WAN-enabled device may convert to a mode in which it operates as an access point to the WAN.

In the scenario illustrated in FIG. 1B, there is no hardwired Wi-Fi access point in the vicinity of the wireless devices. In this example, though the user of computing device 110 may desire to connect to the Internet using the device's Wi-Fi capabilities, a connection using the conventional approach of FIG. 1A is not possible because there is no hardwired access point. However, in the scenario of FIG. 1B, an Internet connection may nonetheless be provided by configuring a WAN-enabled device to act as an access point. In the example of FIG. 1B, smartphone 154 may be configured to operate as a Wi-Fi access point and may further be configured to provide an Internet connection service. These configurations may be made without extensive user interaction with the wireless devices and in a way that allows smartphone 154 to operate using relatively little power.

To facilitate this service, a peer-to-peer group may be formed that includes computing device 110 and smartphone 154. This group may be formed in any suitable way. In the embodiment illustrated, it may be formed according to the Wi-Fi Direct protocol. In some scenarios, this group may be initiated by a user of computing device 110 using techniques as are known in the art. The user, for example, may request that computing device 110 search for and pair with smartphone 154. Such a request may be an express request or may be implied from other user input. For example, a user may supply input requesting in general that an Internet connection be established, or, as another example, the user may access an application that operates using an Internet connection. Alternatively or additionally, in some embodiments, a group including computing device 110 and smartphone 154 may be defined as a persistent group or such pairing otherwise may occur without express user input.

In the scenario illustrated, computing device 110 is designated as the Group Owner for the peer-to-peer group. Accordingly, smartphone 154 may be a client in the group. The designation of a Group Owner and a client may be arrived at based on any of a number of factors, such as the functions each device plays or remaining battery life of each device.

Though not illustrated in FIG. 1B, computing device 110 may be the Group Owner for a group of devices other than smartphone 154 which would also be a factor in making it a Group Owner in its connection to smartphone 154. For example, computing device 110 may also be connected to printer 134 and/or camera 130 as in FIG. 1A.

In this scenario, smartphone 154 may have a connection 172 to the Internet 124. Connection 172 may be a WAN connection. In this specific example, connection 172 may be over a cellular network to base station 152. Such a connection may be formed using technology as is known on the art. Though, such a connection may be supported using any other suitable technology. In this example, the connection 172 may be formed in a different channel than connections 162 and 182. Accordingly, these connections in different channels may be formed using different radios. Though, it is not a requirement of the invention either that these connections be formed in different channels or with different radios.

Despite the fact that smartphone 154 has a connection to the Internet, in a conventional peer-to-peer protocol, that connection may not be available to computing device 110, even though computing device 110 and smartphone 154 are connected in a peer-to-peer group. In the illustrated scenario, that connection is not available because, as a client, smartphone 154 may not support an Internet connection service in accordance with the protocol of the peer-to-peer group.

Nonetheless, because computing device 110 is connected in a peer-to-peer group with smartphone 154, the devices may communicate over link 162. Accordingly, computing device 110 may send a communication over link 162 that serves as a request for smartphone 154 to change its operating mode. In response to such a request, smartphone 154 may then change its operating mode to enable computing device 110 to take advantage of a connection that smartphone 154 may form over the WAN to which it can connect. In this example, smartphone 154 may provide an Internet connection service. In other embodiments, smartphone 154 may provide different or additional WAN-based services to computing device 110, such as supplying functionality accessed as a result of a connection to server 140.

In response to such a request, smartphone 154 may change its mode to an operating mode supporting provision of a service to computing device 110. In the illustrated example, smartphone 154 changes to a mode in which it operates as a Wi-Fi access point. A computing device—though not constructed as a hardwired access point—that nonetheless operates as a Wi-Fi access point is sometimes said to operate as a "soft" access point, or "soft AP". In this scenario, smartphone 154 may be configured with technology as is known in the art to implement a "soft AP". In this mode, smartphone 154 can then provide connectivity to Internet 124 or other suitable service.

Computing device 110 may then form a connection 182 to smartphone 154 acting as a soft AP to obtain Internet connectivity. Such a connection may be formed using the same functionality that it would use to connect to the Internet through hardwired access point 120 (FIG. 1A).

Figure 2:
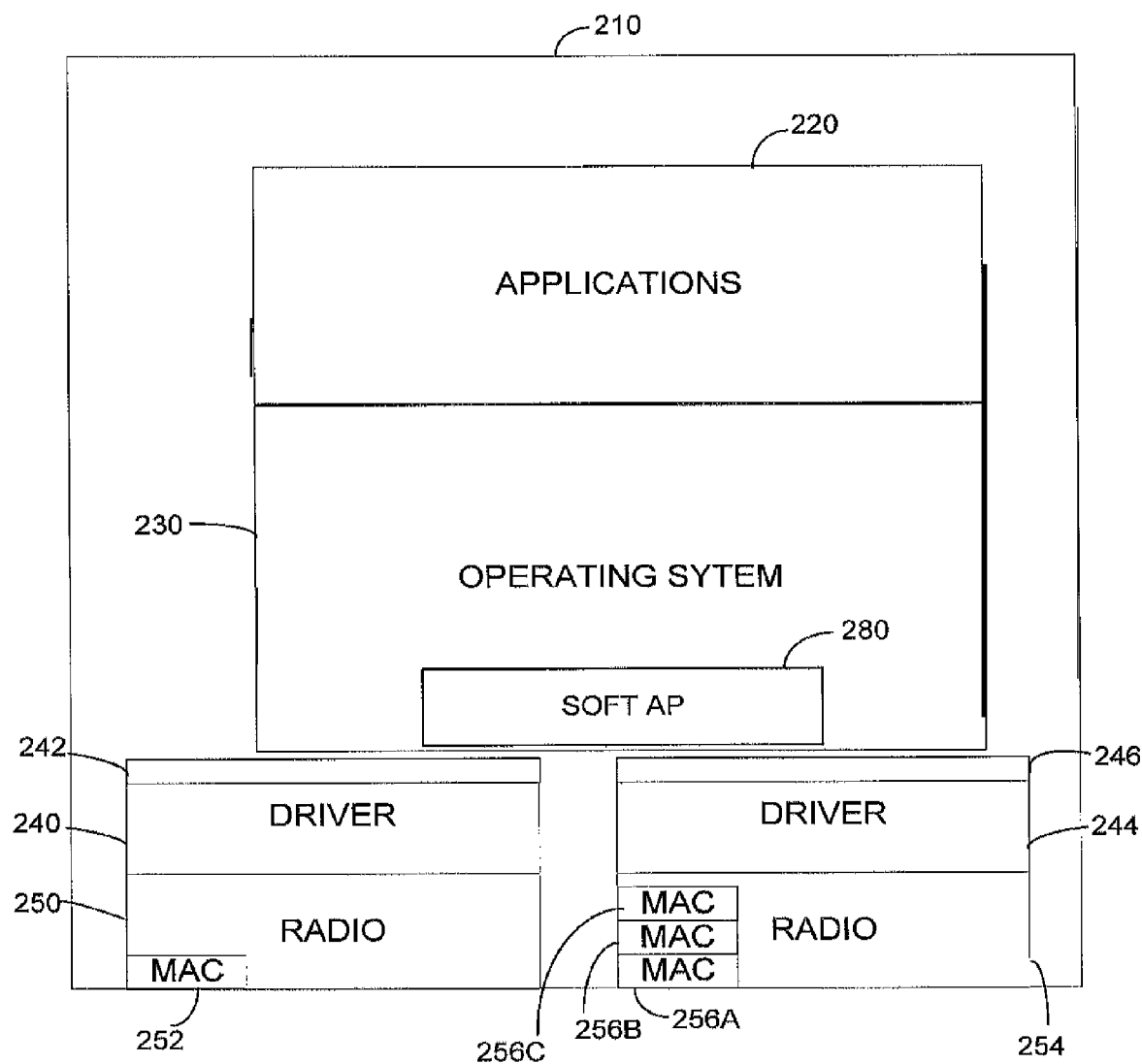
FIG. 2 is a schematic block diagram of a wireless device that may operate as a WAN-enabled device or a wireless device seeking connectivity services through a WAN-enabled device.

Wireless devices, such as computing device 110 and smartphone 154 may be constructed in any suitable way. An exemplary embodiment, which may represent either or both of computing device 110 and smartphone 154, is provided in FIG. 2. FIG. 2 illustrates, at a high level, an architecture for a computing device 210 that may be operated to form an infrastructure mode wireless connection, such as wireless connection 122 and 182 (FIGS. 1A and 1B) and peer-to-peer wireless connections, such as connections 132, 136 and 162 (FIGS. 1A and 1B). In the example of FIG. 2, computing device 210 includes two radios, radio 250 and radio 254. Each of the radios may be adapted to send and receive wireless communications. Radio 250, for example, may be used to form wireless connection 122. Radio 254, for example, may be used to form peer-to-peer connections 132 and 136. Though, in a scenario in which computing device 210 is representative of smartphone 154, one of the radios may be used to form a connection to a WAN. That radio, for example, may be a cellular radio.

In this example, radio 250 has a media access control (MAC) address 252. The MAC address may be a unique identifier associated with radio 250 such that it may be used to distinguish radio 250 from radio 254 and also from radios in any other devices with which computing device 210 may communicate. Accordingly, the MAC address 252 may be included in packets sent by radio 250 to indicate that the frame was sent by radio 250 or may be included in packets directed to radio 250 to indicate that a frame is intended for radio 250.

MAC address 252 may be assigned to radio 250 in any suitable way. It maybe assigned, for example, by the manufacturer of radio 250. Though, in some embodiments, MAC address 252 may be assigned by operating system 230 or another component of computing device 210 or by some other component in a system in which computing device 210 is operating.

Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. Rather, driver 240 may translate the commands, in the standardized format of interface 242, into specific control signals that are applied to radio 250. Additionally, driver 240 may be programmed to perform certain low level functions associated with a wireless connection. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

Though driver 240, and in some instances radio 250, may automatically perform low level functions associated with establishing and maintaining a wireless connection, higher level functions may be performed under control of operating system 230 or applications 220. In some embodiments, an application 220 or operating system 230 may provide a user interface such that ultimate control of wireless communication is provided by a user of computing device 210.

In the embodiment illustrated in FIG. 2, computing device 210 also includes a radio 254. While radio 250 may be used, for example, for a connection to an infrastructure network, radio 254 may be used to form one or more peer-to-peer connections, such as connections 132 and 136.

Radio 254 is incorporated into computing device 210 with generally the same architecture as radio 250. Radio 254 is associated with a driver 244 that provides a mechanism for operating system 230 to control radio 254. Driver 244 has an interface 246 through which operating system 230 may send commands to driver 244 and driver 244 may provide status to operating system 230. Interface 246, like interface 242, may be a standardized interface such that operating system 230 may communicate with driver 244 using a similar set of commands as are used to control driver 240. Though, because radio 254 is used to implement peer-to-peer connections, driver 244 may respond to different or additional commands than driver 240 in order to implement functions associated with peer-to-peer communications that do not exist for infrastructure based communications.

As an additional difference between radios 250 and 254, radio 254 is illustrated as having multiple MAC addresses. In contrast, radio 250 includes a single MAC address 252. Here, MAC addresses 256A, 256B and 256C are illustrated. Multiple MAC addresses, for example, may be assigned by a manufacturer of radio 254 or the MAC addresses may be assigned in any suitable way, including as described above in connection MAC address 252. Alternatively, one or more of the MAC addresses may be assigned based on an identifier of the user of computing device 210.

Having multiple MAC addresses allows radio 254 to appear to devices external to computing device 210 as multiple entities, each with a separate MAC address. As an example, if computing device 210 is separately communicating as a Group Owner in a first peer-to-peer group and as a client in a second peer-to-peer group, separate entities may be established for the Group Owner and the client. Devices external to computing device 210 may address packets intended to be processed by computing device 210 as a Group Owner in the first group with a first MAC address. Packets intended to be processed as a client in the second group may be addressed with a second MAC address. Similarly, computing device 210 may insert the first MAC address in packets coming from the Group Owner; packets from the client may include the second MAC address.

To allow operating system 230 to associate its interactions with driver 244 with a specific one of those entities, internal to computing device 210, each of the entities may be represented as a port. Accordingly, operating system 230 may send commands to or receive status information from each such entity through a port associated with that entity.

Each of the ports may be configured to perform functions appropriate for the type of entity the port represents. An embodiment in which computing device 210 operates according to a Wi-Fi Direct, which is used herein as an example of a peer-to-peer protocol, a device that is part of a peer-to-peer group may take on a role of a Group Owner or a client. A Group Owner may be required in accordance with a wireless protocol to send certain types of action frames and respond to other types of action frames in specified ways. A device configured as a client may send different action frames and responses or may send the same action frames and responses in different contexts.

Though, it should be appreciated that a Group Owner and a client are just two examples of the roles that radio 254 and driver 244 may be configured to perform. As another example, an entity may be configured as neither a Group Owner nor a client. Rather, an entity may be assigned a role as a controller that manages interactions with other devices to form a group and determine the role of computing device 210 in that group.

In some scenarios, radios 250 and 254 may be used independently. In other scenarios, the radios may be used together. As one example, one of the radios may be used to support a WAN connection, such as connection 172. Another radio may be used to support a Wi-Fi connection and/or peer-to-peer connection, such as connections 162 and 182. In embodiments in which computing device 210 is configurable as a soft AP, a control component 280 providing soft AP functionality may be included.

Control component 280 may be implemented using technology as is known in the art. It may be implemented in hardware or software. Though, in embodiments described herein, control component 280 is implemented in software. As illustrated, control component 280 interacts with both radio 250 and radio 254, allowing data communicated over the WAN connection to be transmitted over the Wi-Fi connection, and vice versa.

Though FIG. 2 illustrates separate radios, radio 250 and radio 254, in devices that do not support a separate Wi-Fi and WAN connections or in scenarios in which a radio may operate over a sufficient frequency range to support both WAN and Wi-Fi communications, only one radio may be present. A single radio may be used, for example, in embodiments in which infrastructure connections and peer-to-peer communications operate using the same frequency channels. In such an embodiment, entities performing roles associated with infrastructure communication and entities performing roles associated with peer-to-peer communications may be implemented with the same radio.

Figure 3:
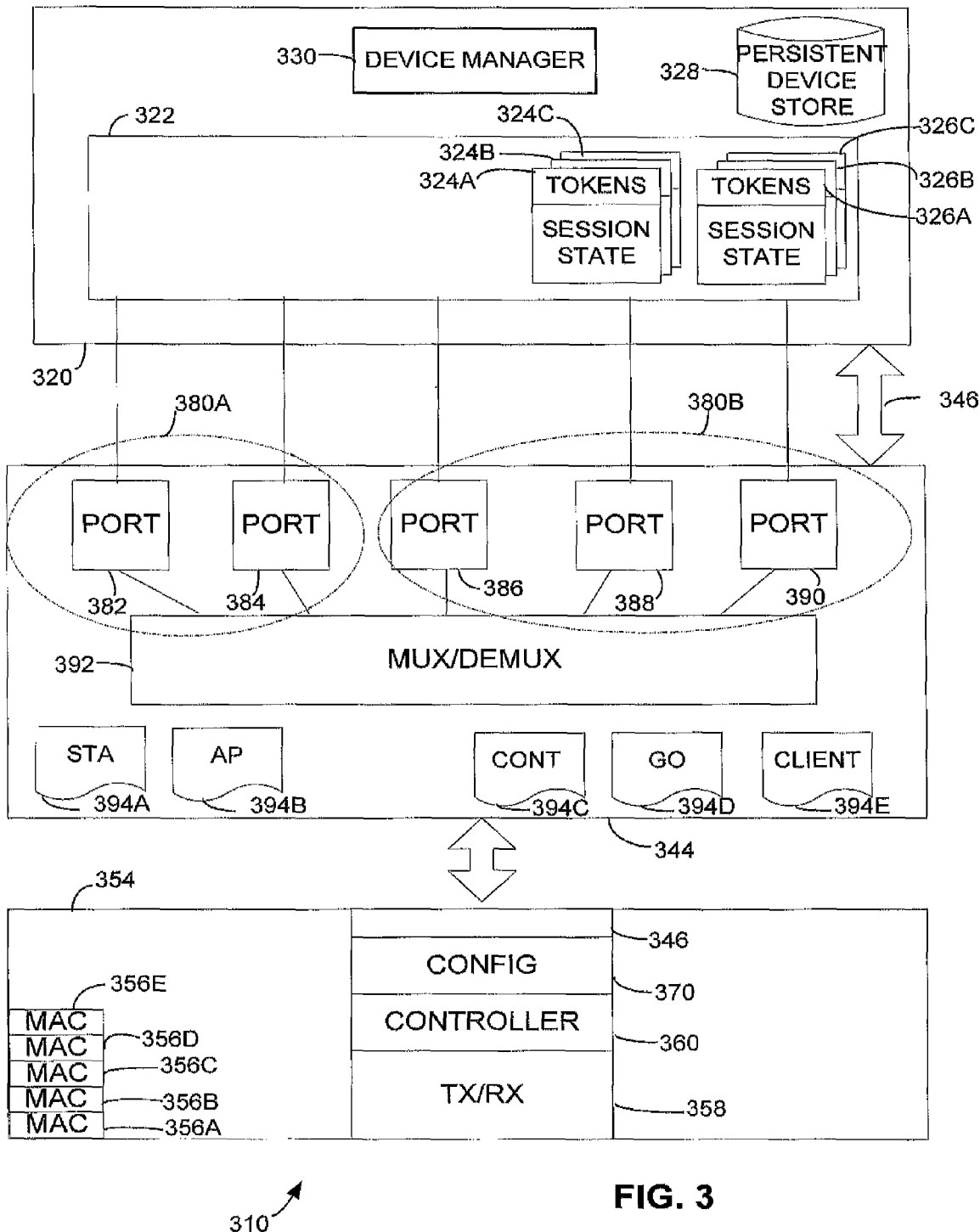
FIG. 3 is a further schematic block diagram showing portions of a wireless device that may operate as a WAN-enabled device providing connectivity services or a wireless device seeking connectivity services through a WAN-enabled device.

FIG. 3 illustrates an embodiment in which a computing device 310 is configured to support, using a single radio, both entities that have a role in an infrastructure network and entities that have a role for peer-to-peer communication. FIG. 3 illustrates computing device 310 containing a radio 354. Radio 354 is illustrated as having multiple MAC addresses, illustrated as MAC addresses 356A, 356B, 356C, 356D and 356E. Though five MAC addresses are illustrated, which may allow radio 354 and its associated driver 344 to concurrently provide five ports, it should be appreciated that the specific number of MAC addresses supported is not critical to the invention and more or less than five MAC addresses may be used in some embodiments.

In this example, the five MAC addresses may be used to provide five ports 382, 384, 386, 388 and 390, each configured to perform a different role. In the scenario illustrated, a group 380A of these ports has been configured to implement entities used for infrastructure based communications. Group 380B contains ports configured for peer-to-peer communications.

In the example illustrated in FIG. 3, group 380A contains two ports, ports 382 and 384. Group 380B is shown containing three ports, ports 386, 388 and 390. It should be appreciated that the number of ports allocated for each type of use is not critical to the invention and any suitable number may be used. Moreover, it is not a requirement that the number of ports in each group remain static. Rather, operating system 320 may issue commands to driver 344 to dynamically create or break down ports as needed.

In conjunction with a command to create a port, operating system 320 may specify a role associated with that port. Driver 344 may respond to such a command by creating a port configured for a designated role, which may be associated with infrastructure-based communications or with peer-to-peer communications. In infrastructure mode, the role may be that of an access point or a station in an infrastructure network. For a peer-to-peer group, the role may be that of a Group Owner or a client. In some embodiments, a further role may be a controller to determine whether a port for a Group Owner or client is to be created. Though operating system 230 may specify a role, the role specified may be determined in any suitable way. For example, when forming a peer-to-peer group, operating system 320 may determine the role by controlling computing device 310 to wirelessly exchange messages with other devices in the group to collectively negotiate a role for each device. As another example, as described herein, a WAN-enabled device may receive a request to operate as a soft AP. Such a request may be processed by a component of operating system 320 or other component that provides information to operating system 320. Regardless of how such a request is processed, processing of such a request may result in a command to configure a port for the role of access point.

Though any suitable mechanism may be used to implement a capability to assign a role to computing device 310, FIG. 3 illustrates an interface 346 between operating system 320 and driver 344. Interface 346 may be an interface to a driver in a standardized format. As one example, some drivers are written in accordance with the NDIS interface specification. In accordance with that specification, commands and status information may be exchanged between driver 344 and operating system 320 using programming objects called OIDs. The NDIS standard defines a number of OIDs that drivers should or may respond to. The standard, though, is extensible such that OIDs may be defined to support additional functionality in certain circumstances. This extensibility may be used to define commands, using OIDs or other suitable representation, that allows operating system 320 to command driver 344 to create or break down a port or to configure a port for a specific role.

Though radio 354 can process packets for multiple ports, other than supporting multiple MAC addresses, radio 354, in some embodiments, need not be specially configured for supporting ports. Radio 354 may be implemented using techniques as are known in the art. In this example, transmitter/receiver section 358 may be a hardware component as is known in the art and used for wireless communications. In this example in which radio 354 is being used to support communications in accordance with the Wi-Fi infrastructure-mode protocol and the Wi-Fi direct protocol for peer-to-peer communications, transmitter/receiver section 358 may support communications in multiple subchannels over a frequency range defined by the Wi-Fi specification. Though, the specific operating characteristics of transmitter/receiver section 358 may vary depending on the specific protocol implemented for communication and are not critical to the invention. Likewise, controller 360 may be a hardware component as is known in the art of wireless radio design. Similarly, configuration register 370 may be a hardware component as is known in the art of wireless radio design. The components indicated as MAC address 356A . . . 356E may also be implemented using techniques as are known in the art. In some embodiments, the MAC addresses supported by radio 354 may be encoded in a read only memory or other component that is a portion of radio 354. Though, it should be appreciated that, in embodiments in which MAC addresses are assigned to radio 354 through driver 344, MAC addresses 356A . . . 356E may be physically implemented in either volatile or non-volatile rewriteable memory such that the pool of MAC addresses to which radio 354 can respond may be dynamically created.

Regardless of the manner in which the components of radio 354 are implemented, radio 354 may contain a hardware interface 346 through which driver 344 may control radio 354. In some embodiments, driver 344 may be computer executable software instructions executing on a processor within computing device 310. Accordingly, hardware interface 346 may be implemented as a bus connection or other suitable interconnection between the processor executing driver 344 and a separate card holding radio 354. Though such hardware interfaces are known in the art, any suitable interface may be used.

To configure radio 354 to support a port, driver 344 may configure radio 354 to process packets for a specific MAC address associated with communications through that port. Driver 344 may write a value into configuration register 370 indicating that a MAC address should be activated such that radio 354 will process received packets identified with that MAC address. In operation, controller 360 may control transmitter/receiver section 358 to respond to any packets identified with a MAC address identified as active by information in configuration register 370. Accordingly, if multiple ports are active, configuration register 370 will contain an indication of each of the active MAC addresses.

In addition to configuring radio 354 to respond to a MAC address for a port, driver 344 may specify communications parameters to be used with that MAC address. These parameters may specify, for example, that a different number of subchannels may be used for communication with different MAC addresses. In this way, communication characteristics of different ports may be controlled based on the role associated with the port. As a specific example, a port configured as a control port may require lower bandwidth than a port for communicating data. Accordingly, radio 354 may be configured to use fewer subchannels or a different encoding scheme for a MAC address that is associated with a control port.

For information to be transmitted, driver 344 and/or radio 354 may be operated such that any frames transmitted containing such information will be identified by the MAC address associated with the port for which the information is being transmitted. Any suitable mechanism may be used to associate MAC addresses with specific frames sent from or received for a specific port. Moreover, this processing may be performed partially or totally within driver 344 and partially or totally within radio 354 because the specific implementation does not impact functioning of the ports.

To implement multiple ports, driver 344 may also be configured. In this example, driver 344 is illustrated to contain computer executable instructions that implement a multiplexer/demultiplexer 392. Multiplexer/demultiplexer 392 operates to route received packets associated with a port to a portion of driver 344 that implements the functionality of the respective port. Conversely, multiplexer/demultiplexer 392 receives packets for transmission from any of the ports and routes those packets to radio 354.

In scenarios in which multiple ports simultaneously have information for transmission, multiplexer/demultiplexer 392 may mediate to establish the order in which radio 354 receives information from the ports. For this purpose, multiplexer/demultiplexer 392 may use any suitable policy. For example, packets carrying action frames may be given priority over packets with data frames. As another example of a policy, transmissions associated with ports operating in infrastructure mode may be given priority over ports operating in peer-to-peer mode. As yet another example, a port configured for the role of Group Owner may be given priority over a port configured for the role of client in a peer-to-peer group. Though, the specific policies applied by multiplexer/demultiplexer 392 are not critical to the invention, and any suitable policies may be employed.

In addition to configuring multiplexer/demultiplexer 392 to route packets, driver 344 may be configured by associating specific functional modules with each of the ports. The specific functional module associated with the port may be based on the role assigned to that port. For example, FIG. 3 illustrates five functional modules. Functional module 394A, when associated with a port, may configure that port to operate in the role of a station in an infrastructure network. Similarly, functional module 394B, when associated with a port, may configure that port for the role of an access point in an infrastructure network. Functional module 394C, when associated with a port, may configure that port for operating in the role of a controller in peer-to-peer mode. The controller, for example, may control communications as the device negotiates or renegotiates a role in a peer-to-peer group. Functional module 394D, when associated with a port, may configure that port for the role of Group Owner in a peer-to-peer group. Functional module 394E, when associated with a port, may configure that port for the role of client in a peer-to-peer group. Other functional modules, though not illustrated in FIG. 3, may alternatively or additionally be included.

Functional modules 394A . . . 394E may be implemented in any suitable way. For example, each of the functional modules may be implemented as a collection of computer executable instructions that are encoded to perform functions for the role associated with the functional module. For example, functional module 394A may be encoded with instructions that control radio 354 to transmit packets as appropriate for a station in an infrastructure network. Additionally, functional module 394A may contain instructions that allow driver 344 to interact with operating system 320 in a way that implements the behaviors of a station in an infrastructure network. As a specific example, functional module 394A may be encoded to automatically generate responses to certain received frames. Additionally, functional module 394A may be encoded to transfer data received in a frame to a location in memory on computing device 310 and then notify operating system 320 that data has been received. Further, functional module 394A may configure radio 354 for the role of that functional module. Such configuration may include setting a number of subchannels or other parameters of the wireless communications used in the specified role. The operations performed by functional module 394 may be similar to those performed in a conventional driver for a wireless network interface card configured only as a station in a Wi-Fi network, and functional module 394 may be encoded using techniques as are known in the art.

Each of the other functional modules may be similarly encoded to interact with the operating system 320 and radio 354 to configure radio 354 and to internally process and generate communications as appropriate for its respective role. Functional module 394B, for example, may be encoded with computer executable instructions that perform operations on or respond to received frames with behaviors as are known in the art for an access point in an infrastructure network. Also, functional module 394B may be encoded to interact with operating system 320 using techniques as are known in the art.

Functional module 394C may be encoded to perform functions associated with establishing a peer-to-peer group. The instructions that implement functional module 394C may likewise be written using techniques that are known in the art. Those instructions may cause radio 354 to transmit packets containing action frames or responses to action frames of the type used in establishing a group for peer-to-peer communication according to a specific protocol and that negotiate or renegotiate roles of devices for such a group. Components within operating system 320 may trigger the sending of those action frames. Though, for some action frames, functional module 394C may be configured to generate a response to an action frame without express action by operating system 320. Table 1 lists examples of action frames that functional module 394C may be commanded to send by operating system 320.

These action frames represent action frames appropriate for a Wi-Fi Direct protocol. Additional action frames used in that protocol may be sent without an express command in response to a received action frame or other suitable trigger. Though, it should be appreciated that different or additional action frames may be used for different protocols, and the specific action frames is not a limitation on the invention.

TABLE I

| Action Frame | Dialog Token Generated by Driver | Port Remains Available After Successful Transmission For Receiving Replies | Receive Indicated to OS |
|---|---|---|---|
| GO Negotiation Request | Yes | Yes | Yes |
| GO Negotiation Response | No | Yes if the response indicates that the negotiations were successful, No Otherwise | Yes |
| GO Negotiation Confirmation | No | No | Yes |
| P2P Invitation Request | Yes | Yes | Yes |
| P2P Invitation Response | No | No | Yes |
| Provision Discovery Request | Yes | Yes | Yes |
| Provision Discovery Response | No | No | Yes |

When the operating system 320 submits a request to a control port to send one of the action frames in Table I, functional module 394C within driver 344 may take actions such as:
  a. Select a dialog token for the transmission. If the send is in response to a request, the operating system may provide the dialog token (as described below) to be used, and driver 344 may then use the specified dialog token.
  b. Complete the request. If driver 344 selected the dialog token, it may report the dialog token to the operating system 320 in the completion of the request.
  c. Sync with the Wi-Fi Direct device to which the frame is targeted. Depending on the implementation, if the send is in response to a received request (e.g. Invitation Response sent on reception of an invitation request), this step may be omitted.
  d. Send the frame & wait for an ACK.
  e. Once the ACK for the frame is received or if none of the retry attempts get an ACK, send a NDIS_STATUS indication to operating system 320 to notify about the transmission status of the action frame. This indication may include the information elements from the packet containing the action frame.

If the send was for a frame that would receive a reply from the peer device and the transmission was successful, the port may remain available for the peer device to send reply action frames to the miniport. The timeout and mechanism of being available may follow the Wi-Fi Peer-To-Peer Technical Specification.

The specific component within operating system 320 that triggers functional module 394C to send action frames when functional module 394C is associated with a port is not critical to the invention. However, FIG. 3 illustrates a device manager 330 within operating system 320. Device manager 330, for example, may be a device manager as is known in the art that may present a user or programmatic interface through which a user or other executing component may request that a communication session be established with a device or a group of devices using peer-to-peer communication.

When a port, such as port 386, is configured to act as a controller for peer-to-peer communication by associating that port with functional module 394C, device manager 330 may interact with port 386 to control various aspects of establishing peer-to-peer communication with one or more devices. For example, device manager 330 may receive user input requesting that computing device 310 be wirelessly connected to a device such as printer 134 (FIG. 1A) or a group of related devices, such as display 160, keyboard 162 and mouse 164 (FIG. 1B). In response to such input, device manager 330 may interact through stack 322 with port 386, causing functional module 394C to control radio 354 to transmit action frames.

The transmitted action frames may be those associated with device or service discovery. Device manager 330 may specify the nature of those requests, such as whether functional module 394C should seek to discover any device in the vicinity of computing device 310 or only devices that provide an identified service, such as a printer service. Though, device manager 330 may be configured to send commands in other formats through port 386 to establish communication with one or more devices in a group.

As an example, FIG. 3 shows that operating system 320 maintains a persistent device store 328. Persistent device store 328 may contain information identifying devices with which computing device 310 has previously established wireless communication. Such information, for example, may constitute persistent group profiles, which may include an identifier used to signal a set of devices to concurrently re-form a group. Device manager 330 may access information in persistent device store 328 to identify specific devices and send commands through port 386 for functional module 394C to generate action frames to establish a wireless connection with a device identified in persistent device store 328. These actions may occur automatically, in response to user input or in response to any other suitable trigger.

In scenarios in which device manager 330 requires information, such as a password or identifier, to establish communication with an external device, device manager 330 may alternatively or additionally interact with a user through a user interface (not expressly shown in FIG. 3) to obtain that information from a user or some other source. That information, which, for example, may be obtained during pairing of computing device 310 to one or more remote devices, may be stored in persistent device store 328. In this way, information obtained from a user, such as during a pairing ceremony with a remote device need not be acquired from the user again to re-establish a peer-to-peer connection with the remote device. Rather, the information may be obtained from persistent device store 328. Though, regardless of the manner in which information input from a user is acquired, when that acquired information needs to be transmitted, device manager 330 may interact with the port configured as a controller to cause that information to be sent.

Regardless of the mechanism that triggers a port configured as a control port, such as port 386, to identify a group of devices, the control port may send and receive action frames to identify one or more devices that form a group including computing device 310. The actions initiated through port 386, in addition to identifying the group, may negotiate a role for computing device 310 within that group. In the illustrated example of the Wi-Fi Direct peer-to-peer protocol, a device may have a role in a group as the Group Owner or as a client.

Communication with another device or devices in the identified group may be performed through a different port. That port may be configured to support behavior in the role identified for computing device 310.

In the example illustrated in FIG. 3, additional ports 388 and 390 are illustrated. Each of these ports may be associated with a different role. For example, port 388 may be associated with the role of Group Owner. Port 390 may be associated with the role of client. Configuring a port for a different role may be performed by associating the port with the functional module that performs operations associated with the role. For example, functional module 394D, which performs functions associated with a device operating as a Group Owner, may be associated with port 388. Likewise, functional module 394E, which performs functions associated with the device operating as a client, may be associated with port 390.

In operation, as packets are received through radio 354 having MAC addresses associated with ports 388 or 390, multiplexer/demultiplexer 392 will route those packets for processing within the associated port. Packets routed to port 388 may be processed by functional module 394D, which may perform actions associated with the role of a Group Owner. Packets containing data frames may be processed by placing the data in memory and notifying stack 322 that data has been received. Such an interaction with operating system 320 may use stack signaling techniques as are known in the art. Though the specific mechanism by which communication between each port and operating system 320 occurs is not critical to the invention.

When action frames are sent as part of a session established with a group in which computing device 310 is the Group Owner, those action frames may likewise be routed by multiplexer/demultiplexer 392 to port 388. Functional module 394C may be configured to either respond to those action frames or may be configured to report the action frames to operating system 320 depending on whether functional module 394C is programmed to respond to them.

Similarly, if computing device 310 is configured for the role of a client in a group, packets relating to communication with devices in that group will be identified with a MAC address that causes multiplexer/demultiplexer 392 to route those packets to a port configured as a client, such as port 390. Port 390 may be associated with functional module 394E, implementing functionality of a client according to a peer-to-peer protocol. Functional module 394E may be configured to transfer data from data frames in such packets to memory and notify operating system 320 of that data, using techniques as are known in the art. Functional module 394E may respond to packets containing action frames or may notify operating system 320 of those management frames.

Functional modules 394C, 394D and 394E may be coded to implement functions prescribed in accordance with a peer-to-peer protocol, such as Wi-Fi Direct protocol. Additionally, functions performed by a device operating in accordance with the peer-to-peer protocol may include detecting a remote device with which a persistent peer-to-peer group was previously formed. Upon detecting such a remote device, functions performed by the device may include establishing communication with that remote device based on previously stored persistent profile information. These functions may be implemented by appropriately configuring functional module 394C. Though, any suitable implementation may be used.

FIG. 3 illustrates a specific hierarchy of communication functions. Certain functions relating to communication with external devices are performed within radio 354. Other functions are performed within driver 344. Yet further functions are performed within operating system 320. Though not specifically illustrated, even further functions may be performed by applications 220 (FIG. 2) or by input from a user or source external to computing device 310. With such an architecture, higher level functions, such as determining which devices to connect to as part of a peer-to-peer group, may be performed at higher levels in the architecture. Conversely, lower level functions, such as generating an acknowledgement to a received packet may be performed at lower levels in the architecture. For example, driver 344 may be configured to generate such an acknowledgement. Any of the functions as described herein may be performed by components at any suitable level of the hierarchy.

Though other architectures are possible that may partition the functions differently so that different aspects of communication are controlled by different components, in the example illustrated, radio 354 and driver 344 are configured to respond statelessly to events, such as commands or received packets. To the extent state information is involved in a communication session, that state information may be maintained within operating system 320. For example, stack 322 may maintain state information for communication sessions carried on through any of the ports 382, 384, 386, 388 and 390. The specific state information maintained may depend on the number and types of states within a protocol supported by each of the ports.

In the example of FIG. 3, session state information 324A is shown associated with port 388. Though not expressly illustrated, session state information may be maintained for other ports. Depending on the protocol implemented by port 388, such session state information may indicate parameters of a session, such as a number of devices that are joined in a group for which computing device 310 is the Group Owner. Other state information, such as a time until those devices may enter a lower power mode, may also be stored as part of the session state information 324.

FIG. 3 additionally shows session state information 324B and 324C associated with port 388. State information 324B and 324C may describe different sessions. Such sessions may arise if computing device 310 is joined in three groups in which it is the Group Owner. To support multiple such sessions, a mechanism may be provided to associate specific frames sent or received with a corresponding session. Any suitable identifier or identifiers may be used. For example, communications with a group of devices may be regarded as a session, such that an identifier of a group may be used to aggregate related communications as part of a session. Stack 322 provides an interface to device manager 330 or other components that associates each session with the appropriate component that is an end point in that session. Such interfacing may be performed using techniques as are known in the art.

In addition to maintaining state information that allows communications from separate sessions to be presented appropriately, stack 322 may maintain, as part of the state information maintained for each session, information that allows stack 322 to relate communications that are part of an exchange of communications to perform a function. For example, when a frame, representing a request, is sent, recognizing that a subsequently received frame is a response to that request may facilitate processing of the request and response. Providing a mechanism to relate communications that are part of an exchange may facilitate processing, particularly if multiple sessions are supported on the same port. To enable recognition of communications that are part of an exchange, "dialog tokens" may be used. A communication initiating an exchange may be tagged with such a dialog token. Upon responding to such a communication, the dialog token from the request may be copied to the response. Accordingly, a device sending a request may associate a response, or any other communication that is part of the same exchange, with the request. Accordingly, state information 324A may contain dialog tokens associated with ongoing communications involving any device communicating as part of the session.

Dialog tokens may be generated in any suitable way. They may be generated, for example, within the operating system 320. Alternatively, if a packet beginning a dialog is initiated in a port, the port or other component within driver 344 may generate the token. Similarly, if a reply to a packet is generated within a port, such as port 386, 388 or 390, the token may be inserted in the reply by that port. Conversely, if a reply to a packet is initiated in response to a command generated within operating system 320, a component within operating system 320, such as stack 322 may specify the token for inclusion in the reply. Table I indicates, for the listed action frames, whether the dialog token associated with an action frame is generated in the operating system or, if not, in the driver. Though, it should be appreciated that Table I represents only one example of how the functionality of generating a dialog token for a frame may be partitioned, and any suitable partitioning of that function may be used.

Similar session state information 326A, 326B and 326C is shown in connection with port 390. Session state information 326A, 326B and 326C may represent state maintained for each of three sessions, with each session being associated with a group in which computing device 310 is a member with the role of client. As with session state information 324A, 324B and 324C a unique dialog token may be associated with each of the sessions, allowing stack 322 to separate received packets associated with each of the sessions. Likewise, computing device 310 may cause a dialog token to be associated with packets transmitted from computing device 310. The dialog tokens may be used to allow stack 322, or similar processing components on remote devices that receive packets from computing device 310, to associate packets that are part of a multi-packet exchange of information. For example, a second packet sent in reply to a first packet may include the token from the first packet. As a result, when the sender of the first packet receives the second packet, it can associate the first packet and second packet with the same dialog.

With the architecture illustrated in FIG. 3, state information concerning each of the connections may be maintained within operating system 320. As a result, the ports 386, 388 and 390 need not maintain state information. In some embodiments, functional modules, such as functional modules 394C, 394D and 394E, that implement the functions of a port do not maintain state information. Rather, each of the functional modules may be encoded to respond to events, such as a command from operating system 320 or a received packet passed on by radio 354. Though, regardless of how this functionality is partitioned, computing device 310 may be controlled to supply functionality associated with multiple entities by establishing and configuring a port to perform the functionality of each entity. As a result, computing device 310, because driver 344 and radio 354 may be configured to support multiple ports, may concurrently operate as different entities. These entities may include entities associated with infrastructure mode communication as well as entity associated with peer-to peer communication.

Regardless of how a computing device is architected, the device may implement functions defined in an infrastructure mode protocol and/or a peer-to-peer protocol. The functions defined in an infrastructure mode protocol may include operating as an access point or as a station. Functions performed by a device operating in accordance with a peer-to-peer protocol may include forming a group of two or more devices for peer-to-peer communication. One aspect of forming a group may include selecting a device of the group to perform functions associated with control of the group. Such functions, for example, may include determining which devices are allowed to join the group, providing an identifier for the group and providing addresses for devices within the group. In the example embodiment described herein, such a device may be a Group Owner. Other devices that are part of the group may be clients of the Group Owner.

Accordingly, the components illustrated in FIG. 3, may enable a wireless device, such as smartphone 154 (FIG. 1B), to act as an access point or for a wireless device, such as computing device 110 (FIG. 1B), to act as a station to connect to an access point. Further, these components may allow the devices to communicate over a peer-to-peer connection to determine an appropriate operating mode of the devices. For example, computing device 110 may send a message requesting that smartphone 154 enter a mode in which it operates as an access point that provides Internet connectivity. With these capabilities, smartphone 154 or other WAN-enabled device may operate according to a process as illustrated in FIG. 4.

Figure 4:
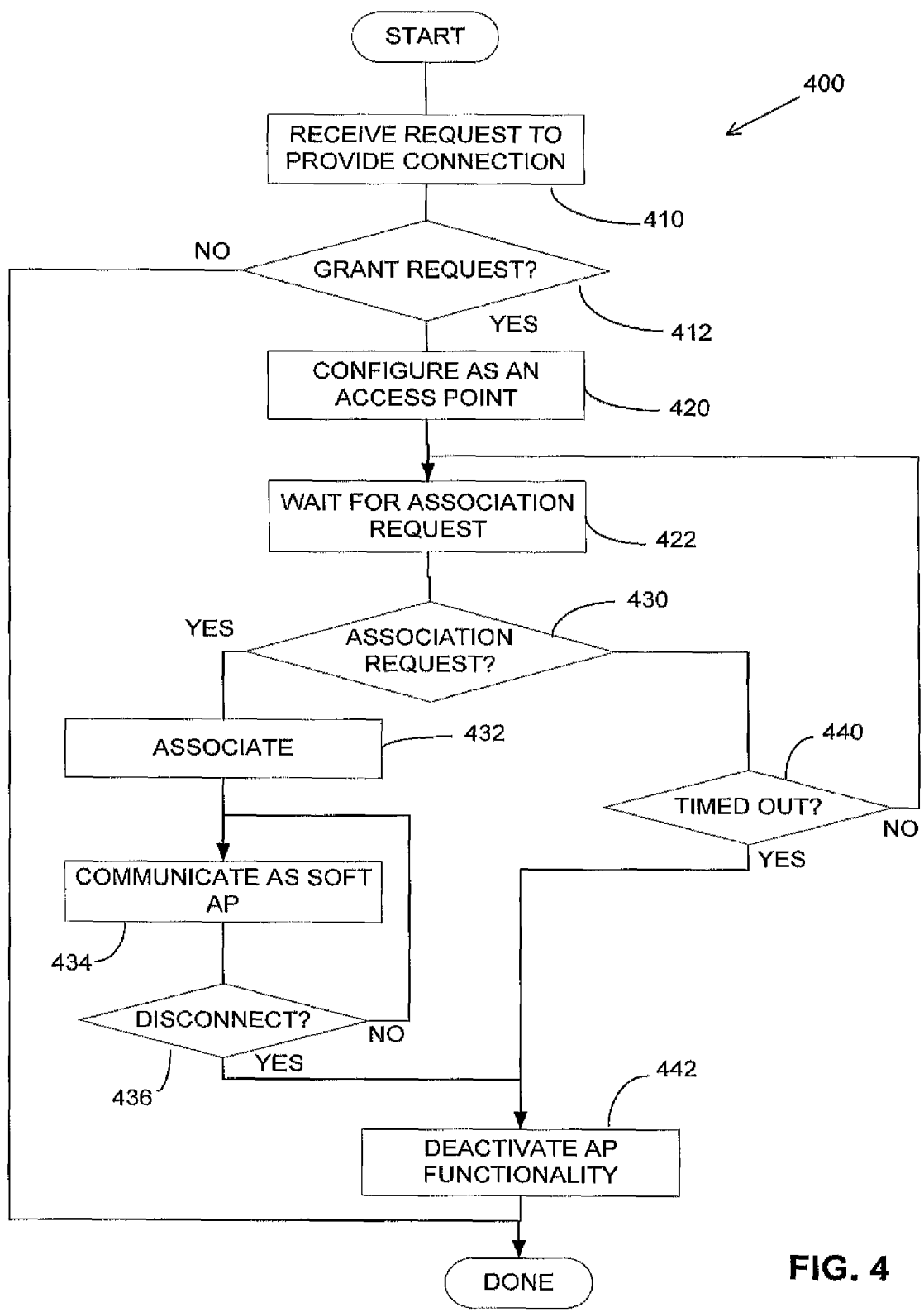
FIG. 4 is a flow chart of a method of operation of a WAN-enabled device in accordance with some embodiments of the invention.

FIG. 4 illustrates a process 400 that may be performed on a WAN-enabled wireless device. For example, process 400 may be performed on Smartphone 154 (FIG. 1B).

Process 400 may begin at any suitable time. However, in the embodiment illustrated, process 400 begins at a time when the WAN-enabled device has joined a peer-to-peer group as a client. Accordingly, the WAN-enabled device may enter a sleep state or other low powered operating mode appropriate for a client in a peer-to-peer group. Nonetheless, the WAN-enabled device may operate according to a protocol such that it periodically is able to receive communications over a peer-to-peer connection.

At block 410, the WAN-enabled device receives such a communication at block 410. In the illustrated scenario, the received communication may be from a device operating as a Group Owner of the peer-to-peer group. In the example of FIG. 1B, the Group Owner is computing device 110, which may send the request received at block 410. Though, it is not a requirement of the invention that a request be generated only by a Group Owner. The request may be generated by any device in the peer-to-peer group or any other device that may communicate with the WAN-enabled device. In process 400, the request received at block 410 is formatted as a request for the WAN-enabled device to provide a service using its WAN connection.

The request received at block 410 may be formatted in any suitable way. For example, the request may be a communication formatted with a code indicating the nature of the request. In some embodiments, the request may include an identification of the wireless device making the request. Other information about the nature of the service requested may alternatively or additionally be included in the communication received at block 410. For example, information in the request may specify a network or specific device on a network to which a connection is requested. The request may also specify parameters of a requested connection, such as a length of time the connection is to be active.

In some embodiments, the request may contain more than one packet. Such an embodiment may allow the request to be provided interactively. For example, the WAN-enabled device may, in response to an initial request provide a challenge message or take other security related actions to identify or validate either a person or device initiating the request.

Regardless of the nature of the request received at block 410, process 400 may proceed to decision block 412. At decision block 412, the process may branch, depending on whether the WAN-enabled device will grant the request. Processing at decision block 412 may be performed in any suitable way. In some embodiments, the processing may entail applying a policy programmed into the WAN-enabled device. The policy may be based on any one or more types of parameters. For example, the policy may be based on parameters relating to the operating state of the WAN-enabled device. A specific example of one such parameter is battery state of the WAN-enabled device. A policy may be in place, for example, to preclude the WAN-enabled device from granting a request to provide a connection service when its battery is below some threshold charge level. Alternatively or additionally, a parameter of the policy may include operations actively being performed by the WAN-enabled device such that a request for a connection service may be denied when the WAN-enabled device is otherwise using its WAN connection for data transfer operations. As yet another example, the policy may depend on a cost state of a subscription to a data service accessed over the WAN connection. For example, some cellular data services impose a charge when usage over a time period (such as a month) exceeds a threshold. If the data usage through the WAN-enabled device is near or has exceeded that threshold in the relevant time period, the policy may prescribe denying the request. Other types of parameters may also be reflected in the policy applied at decision block 412. For example, the nature or operator of the device that has requested the connection service or a priority attached to the request may be a parameter of the policy applied at decision block 412. As a specific example, a connection request may be granted only to specified devices or users. Those devices or users may be identified based on a password or other information supplied with the request.

Regardless of the parameters of the policy applied at decision block 412, if application of the policy results in denial of the request, process 400 may branch from decision block 412 to its end. If process 400 branches to its end, the connection request received at block 410 does not result in the WAN-enabled device changing operating modes. The device may remain in its prior operating mode, such as, as a client in a peer-to-peer group.

Conversely, if application of the policy at decision block 412 results in a determination that the connection request should be granted, process 400 may branch from decision block 412 to block 420. At block 420, the WAN-enabled device implementing process 400 may configure itself as an access point. Configuring as an access point may entail activating a control component, such as control component 280 (FIG. 2). Alternatively or additionally, configuring as an access point may entail associating a functional module, such as functional module 394B (FIG. 3), with a port, such as port 382 or 384 (FIG. 3). Though, it should be appreciated that any suitable mechanism may be used to configure a wireless device as an access point.

As a result of configuring as an access point at block 420, the WAN-enabled device may establish a connection to the Internet. Such a connection may be established through a base station, such as base station 152 (FIG. 1B) or in any other suitable way. Additionally, configuring as an access point may entail transmitting control communications appropriate for an access point. As one example, those control communications may include beacons that allow a station seeking to associate with the access point to identify the access point and begin a session through the access point. Because actions such as transmitting beacons entail consumption of power, which may be supplied from a battery of the WAN-enabled device, configuring as an access point at block 420 may result in the WAN-enabled device entering a higher power consumption state.

Once the WAN-enabled device is configured as an access point, process 400 may proceed to block 422. At block 422, the WAN-enabled device may wait for an association request. The WAN-enabled device may wait for an association request that has any suitable format. In embodiments in which the WAN-enabled device is operating as an access point in accordance with a Wi-Fi protocol, the association request may be formatted in accordance with a Wi-Fi protocol. Though, it should be appreciated that the specific format of the association request is not critical to the invention.

At decision block 430, process 400 may branch depending on whether the association request has been received. In some embodiments, the WAN-enabled device may respond in the same fashion to any association request. In such an embodiment, any device, whether or not the device issued the request received at block 410, may connect through the WAN-enabled device operating as an access point. In other embodiments, limits may be placed on the devices with which an association will be formed. For example, processing at decision block 430 may recognize only an association request from the device that transmitted the request at block 410. Alternatively or additionally, security techniques as are known in the art may limit access to the WAN to only authorized devices.

Regardless of the criteria used to determine whether a received communication is an acceptable association request, when such an association request is received, process 400 may branch from decision block 430 to block 432. At block 432, the WAN-enabled device may associate with the remote wireless device that transmitted the association request.

Once an association is formed, the WAN-enabled device may provide connectivity to the remote wireless device. Such connectivity may allow the remote wireless device to access the Internet or other service over the WAN connection supported by the WAN-enabled device. Accordingly, process 400 may proceed to block 434 where the WAN-enabled device, in its role as an access point, communicates with the remote wireless device.

Process 400 then may proceed to decision block 436. The process may branch at decision block 436 depending on whether the connection to the remote wireless device should be disconnected. Processing at decision block 436 may entail application of any one or more policies of the WAN-enabled device. If, as a result of application of those policies, the connection is to be maintained, processing loops back from decision block 436 to block 434 such that the remote wireless device may continue to have network connectivity through the WAN-enabled device operating as an access point. Conversely, if as a result of processing at decision block 436 it is determined that the connection should not continue, the process may branch from decision block 436 to block 442. At block 442, the WAN-enabled device may again change its operating mode. In this case, though, the WAN-enabled device deactivates the access point functionality established at block 420. As noted above, operating as an access point may increase power consumption of the WAN-enabled device. Accordingly, deactivating the access point functionality may conserve power of the WAN-enabled device.

Accordingly, processing at decision block 436 to determine whether to end a connection may depend on factors including a power state of the WAN-enabled device. As a specific example, if the remaining battery power drops below a threshold, processing may branch from decision block 436 to block 442. Though, it should be appreciated that other criteria may alternatively or additionally be applied at decision block 436. Those criteria may include whether the remote wireless device has disconnected or is otherwise not communicating above a threshold rate through the access point that, in accordance with a policy warrants keeping the access point functionality active. Though, it should be recognized that any suitable parameters may alternatively or additionally be applied in making a determination at decision block 436. These parameters may include a charge state of a device, whether the connection has been active for an amount of time exceeding a preset limit, transmission of an amount of data that exceeded a threshold or has incurred data usage charges over the WAN that exceeds a limit. Regardless of the criteria used, when a determination is made to disconnect, processing may proceed to block 442, following which the WAN-enabled device may return to its operating mode at the beginning of process 400.

Returning to decision block 430, if a suitable association request has not been received, process 400 may branch to decision block 440. At decision block 440, the process may again branch based on an amount of time that has elapsed since the WAN-enabled device was configured as an access point at block 420. The time threshold applied at block 440 is not critical to the invention. However, the time threshold may be chosen to reflect the fact that operation as an access point consumes additional power. The selected limit may also reflect the expectation that the device sending the request received at block 410 will promptly seek to obtain network conductivity through the WAN-enabled device operating as an access point. Accordingly, the time threshold applied at decision block 440 may be relatively short, such as thirty seconds or less. Though, in other scenarios, a longer threshold may be applied.

Regardless of the specific value of the threshold applied at decision block 440, if the threshold has not been exceeded, process 400 may loop back to block 422 where the WAN-enabled device may continue to wait for an association request. Conversely, if the time threshold has been exceeded, process 400 may branch from decision block 440 to block 442. As described above, if processing reaches block 442, the WAN-enabled device may deactivate its access point functionality and return to a lower power operating state.

Figure 5:
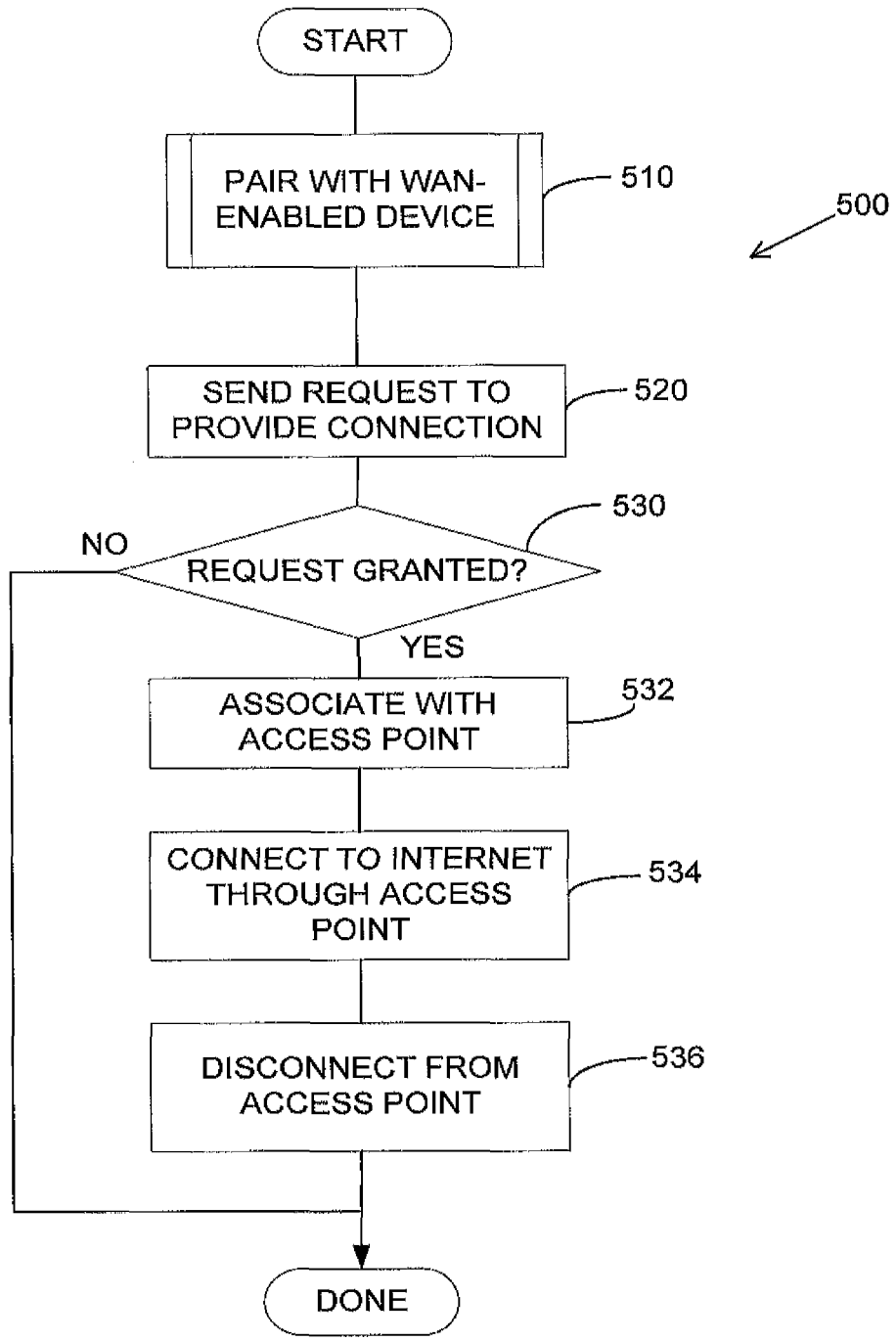
FIG. 5 is a flow chart of a method of operation of a wireless device seeking connectivity services through a WAN-enabled device.

Turning to FIG. 5, a process 500 is illustrated. The process 500 may be performed by a wireless device seeking to obtain network connectivity through a WAN-enabled device. The process 500, for example, may be performed by a device such as computing device 110 (FIG. 1B). Such a device may seek connectivity through a device, such as Smartphone 154 (FIG. 1B), or any other device capable of executing process 400 (FIG. 4).

Process 500 may begin at any suitable time in response to any suitable event. For example, process 500 may begin in response to user input indicating a desire to access the Internet or other network service. The user input may be express user input, or may be implied from a user action. For example, accessing an application or clicking on a link to an Internet URL may service as an implied user input indicating a desire to access the Internet. Such input may be provided through a component of an operating system of the wireless device or in any other suitable way.

Process 500 is shown beginning with a subprocess 510. In subprocess 510, the wireless device pairs with a WAN-enabled device. Though not expressly illustrated in FIG. 4, the WAN-enabled device executing process 400 may perform a corresponding portion of the pairing subprocess in order to become a client of a peer-to-peer group.

Subprocess 510 may be performed in any suitable way, including using techniques as are known in the art. For example, subprocess 510 may be performed in accordance with the Wi-Fi Direct peer-to-peer protocol. Regardless of the specific protocol used, as a result of the pairing performed in subprocess 510, the wireless device executing process 500 may become a Group Owner of a peer-to-peer group that includes a WAN-enabled device.

Accordingly, at block 520, the wireless device may send over the peer-to-peer connection a request to the WAN-enabled device. The request may indicate that the wireless device is seeking connectivity services, such as an Internet connection. The request may further signal a request to obtain the requested service by associating with the WAN-enabled device using a Wi-Fi protocol. Such a request may be in the format described above in connection with block 410 (FIG. 4).

Regardless of the format of the request, processing may proceed to decision block 530. At decision block 530, process 500 may branch, depending on whether the request is granted. The wireless device executing process 500 may use any suitable processing to determine whether the request has been granted. In some embodiments, an express acknowledgement or other communication may be received indicating whether a request was granted. In other embodiment, detecting that the WAN-enabled device that was the target of the request transmitted at block 520 has begun beaconing as an access point may be used as an indication that the request was granted. Conversely, passage of a sufficient amount of time without detecting that the WAN-enabled device is beaconing may be taken as an indication that the request was denied.

Regardless of the mechanism by which the wireless device determines at decision block 530 whether the request is granted, process 500 may branch to its end if the request is not granted.

Conversely, if the request is granted, processing proceeds from decision block 530 to block 532. At block 532, the wireless device associates with the access point provided by the WAN-enabled device. Associating at block 532 may be performed in any suitable way. For example, processing may entail transmitting messages in accordance with the aspects of a Wi-Fi protocol applicable to a station.

Regardless of the specific form of the messages sent at block 532, as a result of associating with the access point provided by the WAN-enabled device, the wireless device may connect to the Internet through that access point at block 534. Processing at block 534 may be performed in accordance with the Wi-Fi protocol or in any other suitable way. Once a connection is established through the access point, a user of the wireless device or applications or other components executing on the wireless device may access the Internet or other services made available through the WAN-enabled device.

Processing then may proceed to block 536. At block 536, the wireless device may disconnect from the access point. Any suitable processing may determine when the connection to the Internet or other service formed at block 534 is no longer required such that the process should proceed to block 536. In some embodiments, express user input may be provided. Though, other criteria may alternatively or additionally be applied. For example, the passage of time or amount of data transmitted may be used as criteria in a decision to disconnect from the access point at block 536. Express user input indicating completion of operations using Internet connectivity may also serve as a trigger for disconnecting from the access point at block 536. This user input may be express user input, such as through a connection manager executing on the wireless device. Though, the user input may also be implied. For example, user input instructing the wireless device to close an application that is accessing the Internet may also serve as a user command to disconnect from the access point. Regardless of the specific event that triggers disconnection from the access point at block 536, once disconnected, process 500 may end.

As can be seen though in FIGS. 4 and 5, a wireless device may simply access a connectivity service through a WAN-enabled device. This connectivity may be simply obtained without requiring a user to configure the WAN-enabled device to support connectivity. Further, the WAN-enabled device may be operated in a way that provides little power drain, which may be important in scenarios in which the WAN-enabled device is battery powered. These capabilities may be advantageous in many scenarios, including scenarios in which a wireless computing device is seeking Internet connectivity through a Smartphone or other portable electronic device that has access to a data service over a cellular network or other WAN.

Figure 6:
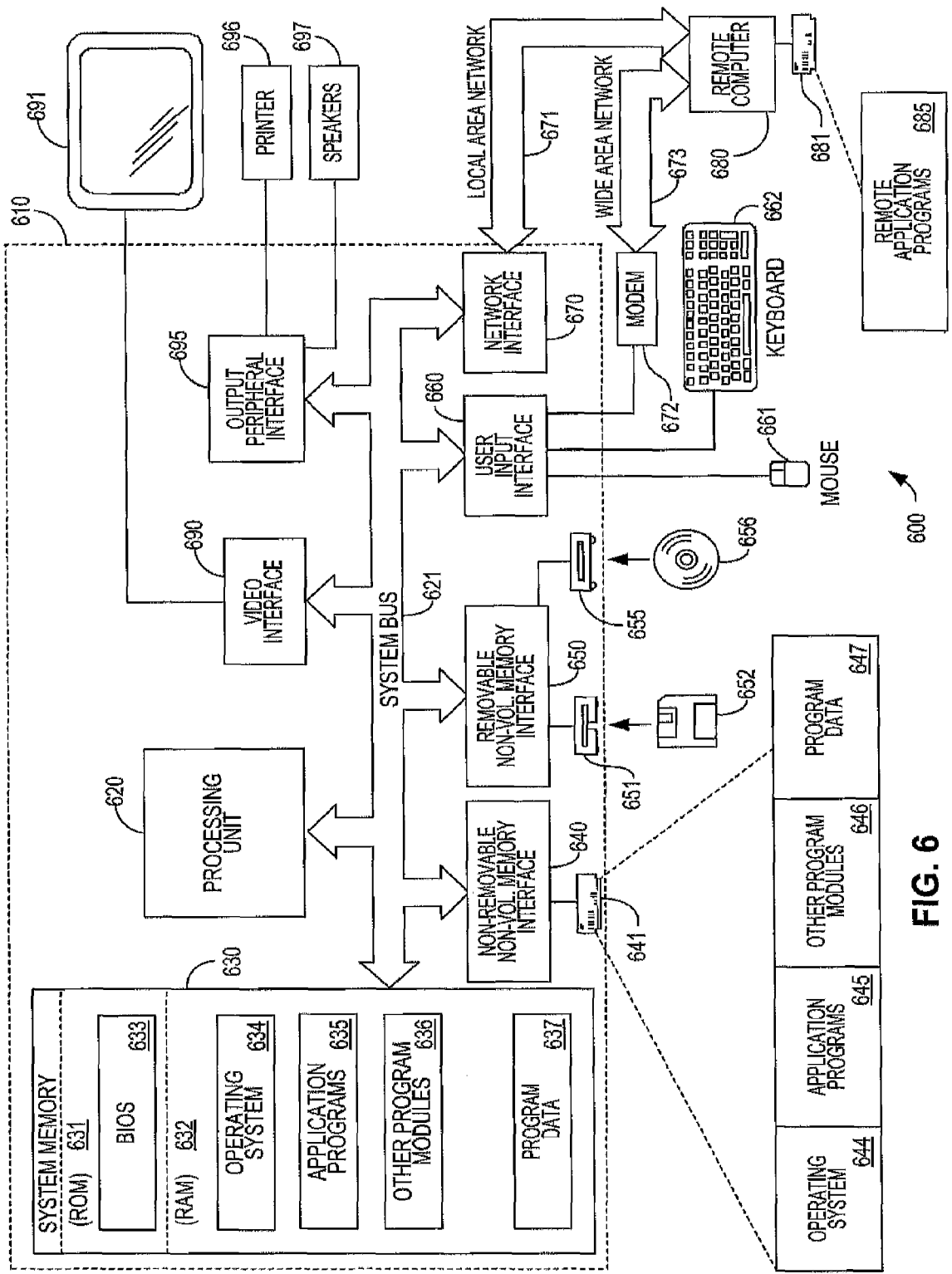
FIG. 6 is a functional block diagram of a wireless device that may operate either as a WAN-enabled device providing connectivity services or a wireless device seeking connectivity services through a WAN-enabled device, according to some embodiments of the invention.

FIG. 6 illustrates an example of a suitable computing system environment 600 on which the invention may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one computer-readable storage medium comprising computer-executable instructions for controlling a portable electronic device to perform a method, the portable electronic device comprising at least two radios configurable, a first radio for communication as an access point to a wide area network and a second radio configurable for communication in a peer-to-peer mode, said second radio comprising a plurality of MAC addresses assigned, the method comprising:

receiving a request from a remote device via said second radio formatted as a peer-to-peer communication by the portable electronic device to perform as an access point to the wide area network via said first radio, said portable electronic device comprising one of a group, said group comprising: a portable computer, a laptop, a Personal Digital Assistant (PDA), a smartphone, a tablet, a smart device and said portable electronic device further comprising a battery and capable of being powered by said battery;

determining whether to grant the request from said remote device according to a policy, said policy depending on a state of said battery;

sending a challenge message to said remote device in response to said request to validate one of a group, said group comprising: said remote device and a user initiating said request;

if said request is granted, waiting to associate with said remote device; and enabling the portable electronic device to operate as a first access point to the wide area network for said remote device, while said portable electronic device is powered by said battery.

2. The at least one computer-readable storage medium of claim 1, wherein enabling the portable electronic device to operate as a first access point comprises:

configuring the portable electronic device to beacon as an access point.

3. The at least one computer-readable storage medium of claim 2, wherein the method further comprises:

associating with a remote device that responds to the beacon.

4. The at least one computer-readable storage medium of claim 1, wherein the method further comprises:

disabling the portable electronic device from operating as the first access point based on a passage of time if no remote device associates with said portable electronic device.

5. The at least one computer-readable storage medium of claim 1, wherein enabling the portable electronic device to operate as an access point comprises configuring the portable electronic device to:

receive communications over a first connection; and relay the received communications over a second connection.

6. The at least one computer-readable storage medium of claim 5, wherein:

receiving communications over the first connection comprises receiving communications formatted in accordance with a Wi-Fi protocol.

7. The at least one computer-readable storage medium of claim 6, wherein:

relaying the received communications over the second connection comprises transmitting content of the received communications over a cellular network.

8. The at least one computer-readable storage medium of claim 7, wherein:

receiving the communication formatted as the peer-to-peer communication comprises receiving the communication formatted as a Wi-Fi Direct communication.

9. A portable electronic device, comprising:

a battery configured to power the portable electronic device;

at least two radios configurable for communication as an access point via a first radio to a wide area network and configurable for communication in a peer-to-peer mode via a second radio, said second radio comprising a plurality of assigned MAC addresses;

a service that, when activated, controls the at least one radio to operate as the access point to the wide area network; and a control component configured to:

receive a request in peer-to-peer mode from a remote device, the request formatted as a request for the portable electronic device to operate as the access point to the wide area network;

send a challenge message in response to said request to said remote device to validate said remote device or a user initiating said request;

determine whether to grant the request from said remote device according to a policy, said policy depending on a state of said battery; and based upon the determination to grant the request, activate the service.

10. The portable electronic device of claim 9, wherein the control component is further configured to:

selectively activate the service based on a power status of the portable electronic device.

11. The portable electronic device of claim 9, wherein the control component is further configured to:

monitor time after receipt of the request; and deactivate the service when the monitored time exceeds a threshold without a remote device forming an association through the access point.

12. The portable electronic device of claim 9, wherein the control component is further configured to:

after a remote device forms an association through the access point, deactivate the service when no remote devices are associated through the access point.

13. The portable electronic device of claim 9, wherein the control component is further configured to:

selectively activate the service based on a challenge message to validate the remote device initiating the request.

14. The portable electronic device of claim 9, wherein the portable electronic device comprises a cellular communication device.

15. A method of operating a computing device, said computing device further comprising a battery, comprising:

transmitting over a first channel a request to a portable electronic device, said portable electronic device comprising at least two radios to operate as an access point via a first radio;

transmitting to the portable electronic device communications formatted to form an association with the portable electronic device via a second radio through one of a plurality of MAC addresses assigned to said second radio;

responding to a challenge message sent from said portable electronic device in response to said request to validate said computing device or a user of said computing device; and communicating through the portable electronic device to access a wide area network, depending upon whether the portable electronic device grants access based upon a policy, said policy depending on a state of the battery of the portable electronic device.

16. The method of claim 15, wherein:

the wide area network comprises a cellular network and the access to a wide area network comprises an Internet connection service.

17. The method of claim 16, wherein:

the computing device is formatted as a Group Owner in a peer-to-peer group; and transmitting over a first channel comprises transmitting a message formatted in accordance with a peer-to-peer protocol, the message being formatted for transmission to a client in the peer-to-peer group.

18. The method of claim 17, wherein:

the computing device comprises a portable computing device; and the portable electronic device comprises a smartphone.

19. The method of claim 15, wherein:

the method further comprises receiving a single user input; and transmitting the request and the communications formatted to form an association with the portable electronic device occur automatically in response to the single user input.

* * * * *